April 25, 1944. J. B. WOODBURY 2,347,229
WIRE ROPE SOCKET
Filed Aug. 26, 1942
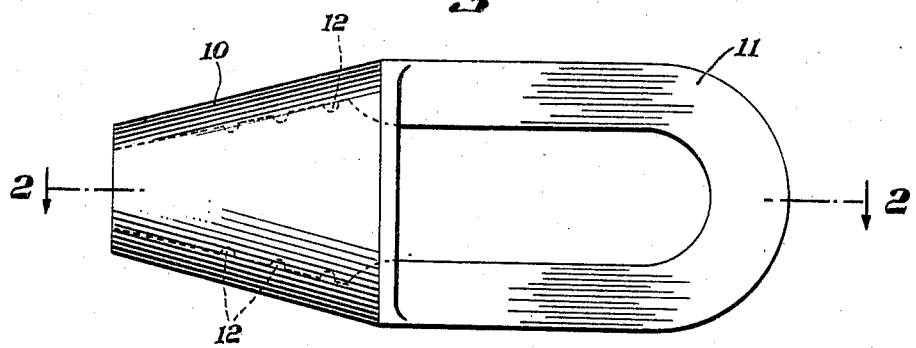
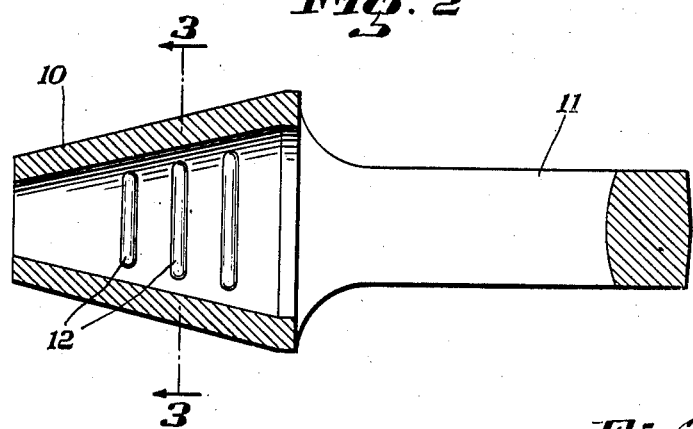
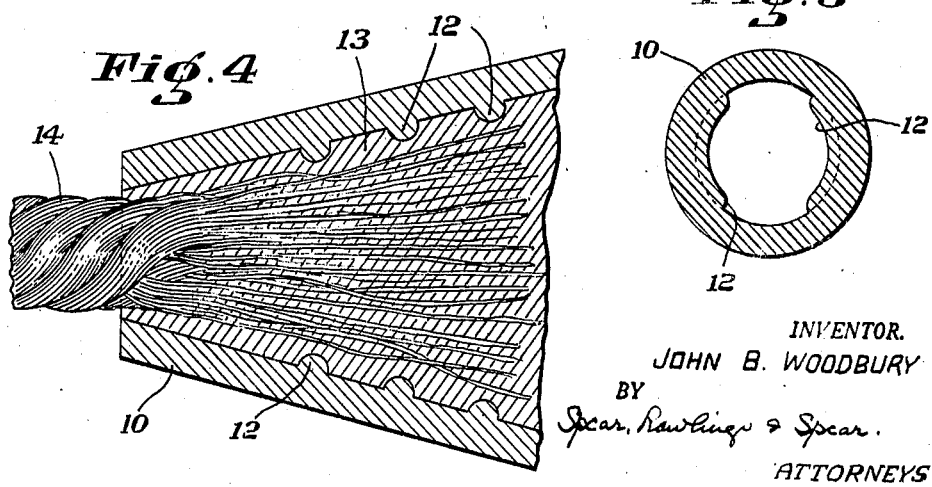
INVENTOR.
JOHN B. WOODBURY
BY
Spear, Rawlings & Spear.
ATTORNEYS Patented Apr. 25, 1944

2,347,229

UNITED STATES PATENT OFFICE 2,347,229

WIRE ROPE SOCKET

John B. Woodbury, South Portland, Maine, assignor to Maine Steel, Inc., South Portland, Maine, a corporation of Maine Application August 26, 1942, Serial No. 456,186

3 Claims. (Cl. 24—123)

This invention relates to wire rope sockets, and particularly to a new and improved method of retaining the spelter cone which anchors the wire rope in the socket basket against up-pressure that would tend to loosen the cone in said basket and also of increasing the stress at which the spelter cone starts to yield and elongate.

The principles of my invention are applicable to wire rope sockets of either the closed or the open type and whether produced by conventional drop-forging methods or by the fabrication method described and illustrated in the companion application of George C. Soule, filed August 17, 1942, Serial No. 455,061.

According to my concept, I retain the spelter cone against movement in the socket basket by welding or otherwise permanently securing to the interior of the socket basket one or more raised ribs or projections of steel, or other metal that is harder than the spelter of the cone. These projections function as a ring of steel operating in a cone of spelter and because the steel ring is stronger than the spelter give great strength and resistance to the tendency of the cone to lift and become loosened in the socket basket.

Where the wire rope socket is made by conventional drop-forging methods, the usual method of anchoring the spelter cone in the socket basket has been to cut grooves around the interior of the socket basket into which some of the spelter material will lodge when the cone is poured and afterwards hardens.

The disadvantage of this, however, is that the total resistance of the spelter cone against up-pressure is only the shearing strength of one or more narrow rings of the weaker spelter material operating in the grooves of the steel socket basket, whereas in my invention the retaining rings are of the stronger metal rather than the weaker metal.

Comparative tests not only show a substantial increase in holding resistance for my raised retaining rings of steel over sockets in which grooves are cut in the socket basket and filled with the spelter material, but also show some increase in the mechanical strength of the socket basket itself, due to the fact that my spelter rings of steel act to some extent as internal annular reinforcements for the socket basket.

In the accompanying drawing, I have shown my invention as applied to a closed drop-forged socket of conventional design. It will be understood, however, that such showing is purely illustrative and in no way limiting, and that my invention is equally applicable to open drop-forged sockets, and to either closed or open sockets produced by the fabrication method disclosed in the aforesaid application of George C. Soule.

In the drawing:

Fig. 1 is an elevation of a closed drop-forged socket equipped with my invention.

Fig. 2 is a longitudinal section on the line 2—2, of Fig. 1.

Fig. 3 is a cross-section on the line 3—3, of Fig. 2, and

Fig. 4 is a fragmentary sectional detail on enlarged scale.

I have indicated at 10 the tapered socket basket and at 11 the reins of a closed drop-forged wire rope socket.

Welded or otherwise permanently assembled to the internal face of the socket basket is a plurality of spaced relatively narrow raised ribs or projections 12 of steel or other metal that is harder than the spelter material which is poured into and hardens within the socket basket to form the spelter cone 13 which anchors the inner end of the wire rope 14 within said basket.

If desired, the ribs 12 may be formed integrally with the socket basket. They may be of any desired size and shape, in any desired arrangement. As shown, they are in the form of interrupted rings (see Fig. 3) and are of sufficient width and spacing to provide adequate resistance to the tendency of the spelter cone to lift in the socket basket under up-pressure.

Being of steel or other metal that is harder than the spelter material of the spelter cone, their resistance to the shearing pressure incidental to such lifting action is greater than that of the spelter cone, and hence they act to more firmly retain the spelter cone against movement in the basket.

Being raised a substantial distance with respect to the internal wall of the basket, they afford a number of spaced anchorages for the spelter of the spelter cone when it hardens, and to some extent also they function as internal annular reinforcements for the basket.

Various modifications in form, proportion, size and arrangement of my raised retaining elements may obviously be resorted to within the spirit and scope of my invention as defined by the appended claims.

What I therefore claim and desire to secure by Letters Patent is:

1. In a wire rope socket, a socket basket within which one end of a wire rope is anchored by means of a cone of hardened spelter material, means for retaining the spelter cone against movement in the basket comprising a rib projecting inwardly from the basket wall, said rib being of substantial area and extending a substantial distance about the basket wall so that when the spelter material is poured into the basket a groove of corresponding width, depth and extent will be formed in the external surface of the spelter cone and will be occupied by said rib on hardening of the spelter material, said rib being of a material which is appreciably stronger than the material of the spelter cone so as to resist shearing strains imposed thereon by the tendency of the spelter cone to become loosened in the basket during service of the wire rope socket, and said rib also acting as an internal reinforcement for the socket basket.

2. The device of claim 1, the socket basket and the rib both being of steel.

3. The device of claim 1, there being a plurality of ribs and said ribs being spaced longitudinally of the basket wall and extending circumferentially thereof for substantial distances.

JOHN B. WOODBURY.